L. COBB.
CARBURETER.
APPLICATION FILED OCT. 13, 1913.
1,102,722.
Patented July 7, 1914.
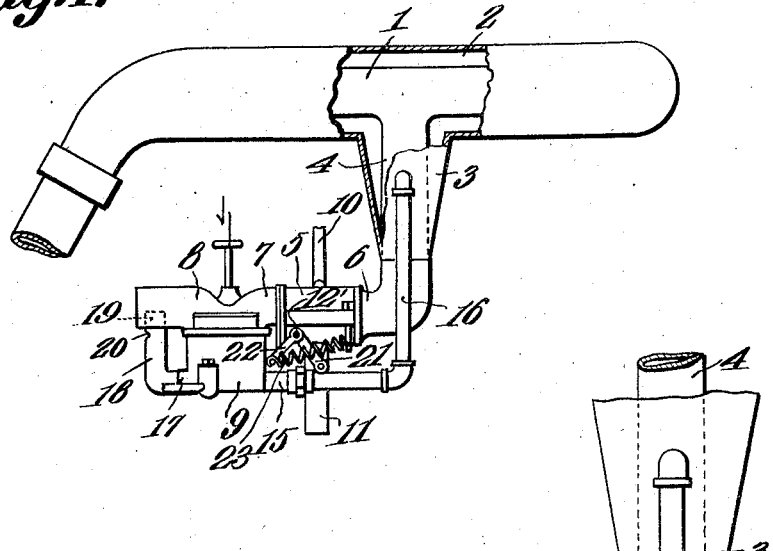
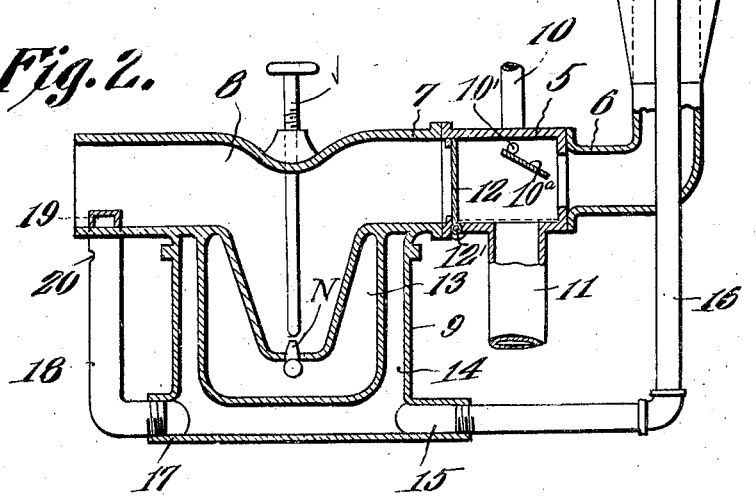
Witnesses
Luther Cobb,
Inventor
by C. A. Snow & Co.
Attorneys

UNITED STATES PATENT OFFICE.

LUTHER COBB, OF BEDFORD, INDIANA, ASSIGNOR TO JAMES D. MARTIN, OF BEDFORD, INDIANA.

CARBURETER.

1,102,722.  Specification of Letters Patent.  Patented July 7, 1914.

Application filed October 13, 1913. Serial No. 794,973.

*To all whom it may concern:*

Be it known that I, LUTHER COBB, a citizen of the United States, residing at Bedford, in the county of Lawrence and State of Indiana, have invented a new and useful Carbureter, of which the following is a specification.

The present invention relates to improvements in carbureters, one object of the present invention being the provision of means whereby the liquid fuel within the float chamber will be heated from the exhaust gases led from the exhaust manifold of the explosion engine, and by means of which the air entering the intake port of the carbureter will also be heated, thus insuring the proper volatilization and intermixing of the fuel with the air to produce a better mixed carbureted air for delivery to the explosion engine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the present attachment, the exhaust manifold being broken away and shown in section to show the intake manifold of the explosion engine. Fig. 2 is a longitudinal sectional view through the complete carbureter attachment showing a portion of the exhaust and intake manifold.

Referring to the drawings, the numeral 1 designates the horizontal portion of the intake manifold which is incased within the horizontal portion of the exhaust manifold 2, the tapered casing 3 of the manifold 2 being extended downwardly and surrounding the vertical portion 4 of the intake manifold. By this means, the upper end of the intake manifold and its member 1 are properly surrounded and incased so as to receive the maximum heat from the exhaust gases delivered through and out of the exhaust manifold 2.

The priming or more volatile fuel mixture delivering member or casing 5 is interposed between the lower inlet end 6 of the intake manifold 4 and the carbureted air outlet 7 of the carbureter 9. Air is drawn in through inlet 8 and downwardly and over the fuel nozzle N, controlled by the valve V, the air being mixed with the fuel to form the explosive mixture.

The casing 5 is provided with the volatile fuel delivery pipe 10 having the inlet 10' and with the air inlet pipe 11, a valve 12 being disposed intermediate of the carbureted air outlet 7 and the casing 5, and disposed to be moved from the full to the dotted line position, the same when in the full line position cutting off the air supply from the carbureted air outlet 7 and permitting air to be delivered through the pipe or conduit 11, while the same when positioned in the dotted line position closes the air inlet 11 and opens the outlet end of the carbureted air outlet 7 of the carbureter.

A baffle plate 10ᵃ is disposed in the casing 5 and inclines to direct the fuel from the outlet 10' into the air current led in from the pipe 11, thus insuring a priming mixture.

The float chamber 13 of the carbureter, which may be taken indicative of any structure of float chamber, is disposed to be incased and surrounded by the heating chamber 14, said chamber being provided with the inlet nipple 15 for the reception of the exhaust gas delivering and heating pipe 16, the upper end of which is connected to the tapered portion 3 of the exhaust manifold to thus receive the exhaust gases from the manifold and deliver it into the chamber 14. The outlet nipple 17 of the chamber or casing 14, has connected therein, the upstanding conduit 18, which is sealed at its upper end 19, the upper end 19 being projected into the inlet end of the air directing conduit 8 of the carbureter, so that the inrushing air will be heated thereby. A vent 20 may or may not be provided in the pipe 18, or the same may be provided with a valve to permit of the slight bleeding to permit of the introduction therein of the burnt gases to keep the tube or pipe 18 properly heated. It will thus be seen that the exhaust gases within the chamber 14 and pipe 18 will properly heat the fuel within the float chamber 13 and will also assist in heating the inrushing air which is adapted to be mixed with the fuel within the conduit 8 before the delivery thereof into the vertical manifold 4.

The stem 12' of the valve 12 is connected to the two cranks 21 and 22, the spring 23 being connected to the arm 22 to normally hold the valve 12 in full line position (Fig. 2). The arm 21 is to be connected to a throttle control, so that the valve 12 may be moved from a vertical to a horizontal position after the engine has been properly started.

The detail structure of the manifold, which relates more particularly to the exhaust manifold surrounding the intake manifold and that structure contiguous or next to the engine, is clearly shown, in the application filed June 23, 1913, Serial No. 775,342, and no claim upon this detailed structure is herein made.

What is claimed is:

1. A carbureter, including a mixing chamber for a volatile priming fuel, said chamber being provided with an air inlet and a carbureted air outlet, a float chamber for the less volatile fuel, a valve controlled nozzle leading therefrom, an air directing tube into which said nozzle projects, said tube having its outlet in communication with the volatile fuel mixing chamber, and a valve for closing the carbureted air outlet of the tube and for opening the air inlet of the less volatile fuel mixing chamber, or vice versa.

2. A carbureter, including a less volatile fuel containing float chamber, an air admitting tube carried thereby, a fuel nozzle leading from the float chamber into the tube, a volatile fuel mixing chamber in communication with the outlet of the tube, a fuel inlet for the latter chamber, an air directing pipe also for the latter chamber, a baffle plate disposed in the latter chamber for receiving the fuel and directing the same into the air current led from the air directing pipe thereof, and a valve mounted at the intersection of the volatile fuel mixing chamber and the outlet of the tube for closing the outlet of the tube or the air directing pipe of the volatile fuel mixing chamber.

In testimony that I claim the foregoing as my own, I have hereto affixed my signature in the presence of two witnesses.

LUTHER COBB.

Witnesses:
 ROBT. L. MELLEN,
 JOHN W. OMERS.

Copies of this patent may be obtained for five cents each, by addressing the "Commissioner of Patents, Washington, D. C."